United States Patent
Christensen et al.

(10) Patent No.: US 7,495,353 B2
(45) Date of Patent: Feb. 24, 2009

(54) POWER INTERCONNECT BLOCK FOR AN AIRCRAFT ELECTRICAL COMPONENT

(75) Inventors: Scott Alan Christensen, Stillman Valley, IL (US); Darin R. Morman, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 129 days.

(21) Appl. No.: 11/496,792

(22) Filed: Aug. 1, 2006

(65) Prior Publication Data

US 2008/0191493 A1 Aug. 14, 2008

(51) Int. Cl.
*H02K 7/10* (2006.01)
*B25G 3/00* (2006.01)

(52) U.S. Cl. .................... 290/40 C; 403/316
(58) Field of Classification Search ............ 290/4 C; 310/71; 439/345
See application file for complete search history.

(56) References Cited

U.S. PATENT DOCUMENTS

| | | | |
|---|---|---|---|
| 3,518,616 A | 6/1970 | Lewis | |
| 4,476,395 A * | 10/1984 | Cronin | 290/6 |
| 4,653,826 A * | 3/1987 | Burgess et al. | 439/248 |
| 4,691,119 A * | 9/1987 | McCabria | 307/84 |
| 4,781,610 A | 11/1988 | Mercer | |
| 4,866,316 A | 9/1989 | Humphries et al. | |
| 5,017,821 A * | 5/1991 | Shervington et al. | 310/68 D |
| 5,063,317 A | 11/1991 | Bruhn | |
| 5,140,207 A | 8/1992 | Baumeister et al. | |
| 5,408,154 A | 4/1995 | Meiser et al. | |
| 5,656,878 A | 8/1997 | Nakata | |
| 5,709,450 A | 1/1998 | Francis et al. | |
| 5,885,102 A | 3/1999 | Harting et al. | |
| 6,099,325 A | 8/2000 | Parkhill | |
| 6,271,608 B1 | 8/2001 | Haydock et al. | |
| 6,300,698 B1 | 10/2001 | Fargo et al. | |
| 6,455,962 B2 | 9/2002 | Suzuki et al. | |
| 6,664,678 B2 | 12/2003 | Shimizu | |
| 6,749,358 B2 * | 6/2004 | Balsells | 403/316 |
| 6,945,805 B1 * | 9/2005 | Bollinger | 439/348 |
| 7,002,271 B2 | 2/2006 | Reed et al. | |
| 2003/0042810 A1 * | 3/2003 | Tornquist et al. | 310/71 |
| 2003/0054701 A1 * | 3/2003 | Hutchinson et al. | 439/852 |
| 2005/0106950 A1 * | 5/2005 | Fink et al. | 439/752 |

* cited by examiner

*Primary Examiner*—Joseph Waks
(74) *Attorney, Agent, or Firm*—Carlson, Gaskey & Olds

(57) ABSTRACT

The power system for an aircraft includes a gear box. Multiple generators are driven by the gear box and are arranged in a circumferentially spaced manner, in one example. Each generator includes a power interconnect block providing a receptacle that receives an electrical lead. The receptacle provides a metallic insert having a hole that receives a connector arranged at an end of the electrical lead. The connectors are inserted into the hole in a direction that is generally parallel with an axis of rotation of a shaft of the generator. An axial retainer is secured between the electrical connector and the power interconnect block to axially locate the connector within the power interconnect block. A spring washer is arranged at a base of the hole to exert an axial force on the connector biasing it against the axial retainer.

17 Claims, 3 Drawing Sheets

POWER INTERCONNECT BLOCK FOR AN AIRCRAFT ELECTRICAL COMPONENT

This invention was made with government support under Air Force Contract No.: F19628-03-C-0014. The government therefore has certain rights in this invention.

BACKGROUND OF THE INVENTION

This invention relates to a method and apparatus for connecting and retaining electrical leads to a power interconnect block of an aircraft electrical component such as a generator.

Generators and electric motors are widely used in the aircraft industry. Limited space is available on an aircraft for packaging components. As a result, installation and servicing the components can be difficult due to very tight packaging. Packaging of power systems within the aircraft can be particularly challenging. In one example power system, a drive unit rotationally drives a gear box that, in turn, drives multiple generators and pumps. In one example configuration, a pair of centrally located pumps are surrounded by six circumferentially spaced generators. The pumps and generators are contained within a common housing. Each of the generators includes a power interconnect block to which phase leads are connected to supply power to other aircraft components. The phase leads are typically connected to the power interconnect block using conventional fastening arrangements to ensure that the electrical leads are securely retained by the power interconnect block. For example, the power interconnect block includes a cover and a base secured about all of the electrical leads. Connectors on the phase leads are secured to stator lead connectors using threaded hole/fastener arrangements.

To assemble or service the electrical leads, the cover must be removed from the power interconnect block. The fasteners are arranged typically normal to a rotational axis of the generator shaft, which requires a significant amount of space to obtain access to the power interconnect block for installation of removal of the phase leads. Significant interference arises when arranging multiple generators within a housing in a circumferentially spaced arrangement because the housing is located in close proximity to the power interconnect block. There is insufficient space for a maintenance technician to manipulate the electrical leads and fasteners. What is needed is an improved apparatus and method of securing electrical leads to a power interconnect block of an aircraft electrical component.

SUMMARY OF THE INVENTION

The power system for an aircraft includes a gear box. Multiple generators are driven by the gear box and are arranged in a circumferentially spaced manner, in one example. Each generator includes a power interconnect block providing a receptacle that receives an electrical lead. The receptacle provides a metallic insert having a hole that receives a connector arranged at an end of the electrical lead. A shell, which provides an exterior of the power interconnect block, is over-molded around the insert to insulate the insert from the surrounding environment. The connectors are inserted into the hole in a direction that is generally parallel with an axis of rotation of a shaft of the generator. The insert exerts a radial force on a circumference of the connector to ensure there is sufficient contact between the insert and connector for transferring power. An axial retainer is secured between the electrical connector and the power interconnect block to axially locate the connector within the power interconnect block. The axial retainer is a spirolock that is rotationally inserted into a groove in the insert to abut a shoulder of the connector, in one example. A spring washer is arranged at a base of the hole to exert an axial force on the connector biasing it against the spirolock.

These and other features of the present invention can be best understood from the following specification and drawings, the following of which is a brief description.

DETAILED DESCRIPTION OF THE PREFERRED EMBODIMENT

Figure 1:
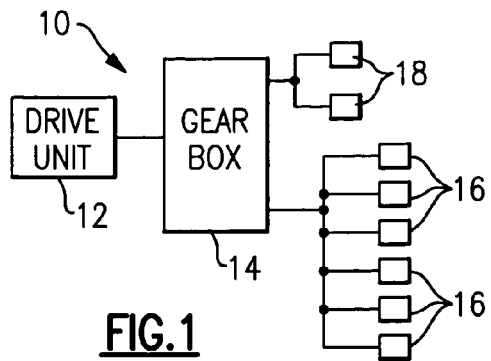
FIG. 1 is a schematic view of one example power system packaging arrangement including a gear box driving multiple generators and pumps.
Figure 2:
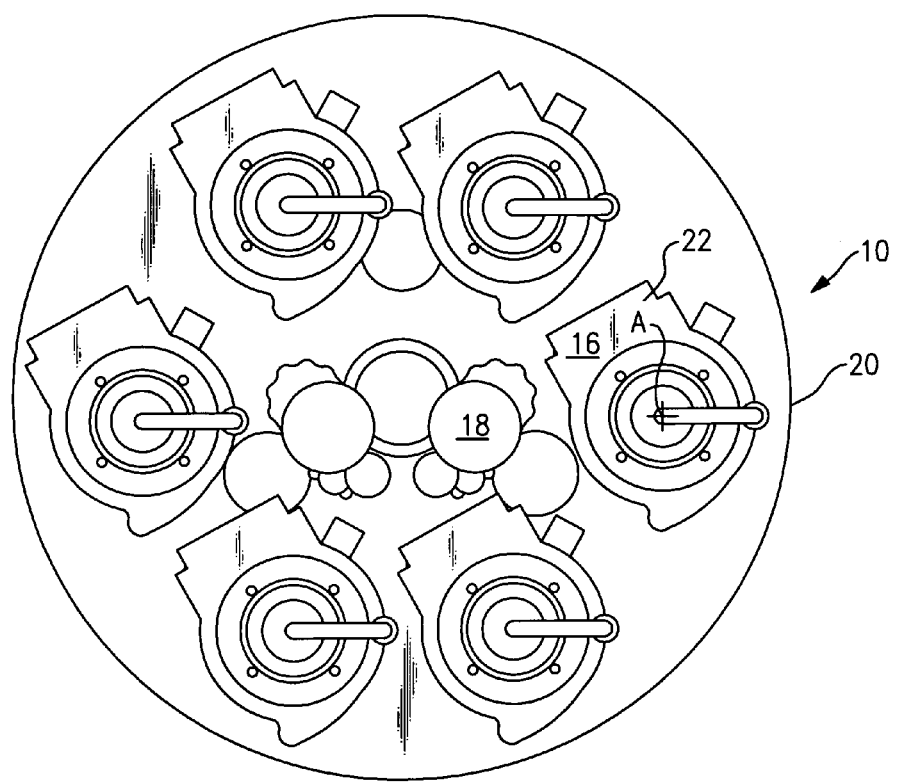
FIG. 2 is an end view of the generators arranged circumferentially about the pumps within a housing.

An example power system 10 for an aircraft is schematically shown in FIG. 1. The power system 10 includes a drive unit 12 that rotationally drives a gear box 14. The gear box 14 drives multiple generators 16 and pumps 18, in the example shown. An example configuration of the generators and pumps 16, 18 is shown in FIG. 2. The drive unit 12 and gear box 14 are not shown in FIG. 2 for clarity.

In the example shown in FIG. 2, two pumps 18 are arranged generally centrally within a housing 20. Six generators 16 are circumferentially spaced around the pumps 18 and are arranged in close proximity to an inner wall of the housing 20. The example configuration provides a dense package, but leaves limited room for assembly and servicing of electrical leads associated with the generator 16.

Figure 3:
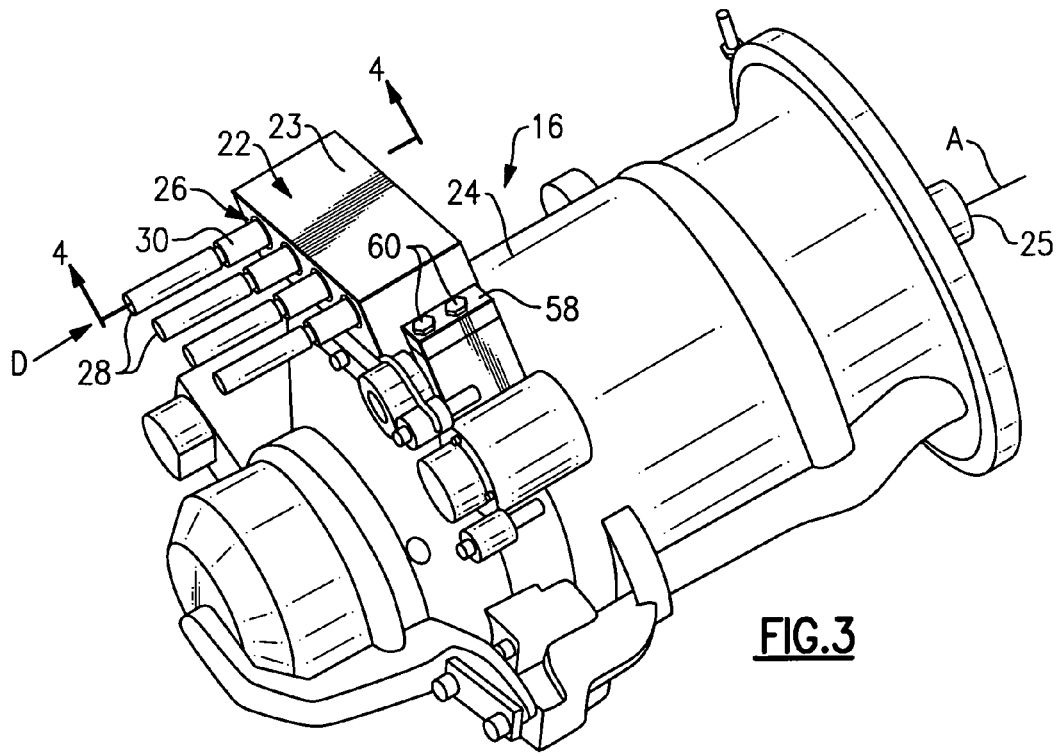
FIG. 3 is a perspective view of a generator with an example power interconnect block.

Each generator 16 includes a power interconnect block 22 for coupling phase or electrical leads 28 to the generator 16 for supplying power to other aircraft components. Referring to FIG. 3, the power interconnect block 22 is mounted externally on a generator housing 24. The generator includes a rotational axis A about which a shaft 25 rotates. The power interconnect block 22 includes a receptacle 26 into which each phase lead 28 is secured. In the example shown, the removal and insertion direction of the phase leads 28 into the receptacles 26 is in a direction D, which is generally parallel with the axis A. The orientation of the phase leads 28 better facilitates installation and removal of the electrical leads within the tight packaging constraints of the housing 20.

Figure 4:
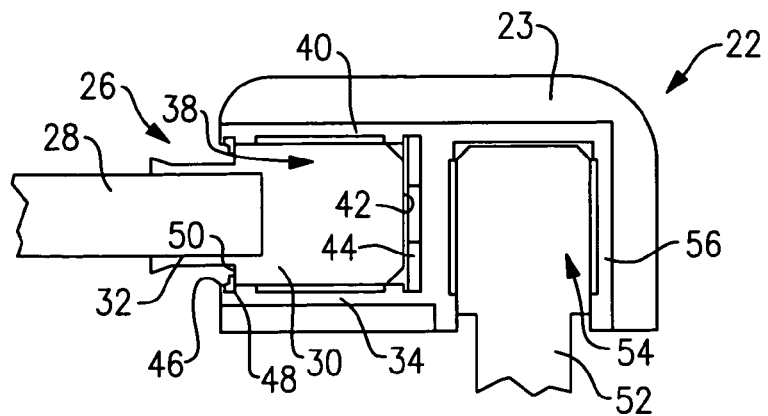
FIG. 4 is a cross-sectional view of the power interconnect block taken along line 4-4 in FIG. 3.

Referring to FIG. 4, an insert 40 is provided for each electrical lead 28, in the example shown. The metallic insert 40, which may be copper, has a shell 23 over-molded about the insert 40 to insulate it from the surrounding environment. A removable cover is not needed for access to the electrical leads 28 in the example shown, as will be appreciated from the discussion below.

Each phase lead 28 includes a connector 30 arranged at an end. The connector 30 includes a swage connection 32 securing the connector 30 to the phase lead wire. The insert 40 provides a hole 38 for receiving the connector 30. In one example, the hole 38 is provided by a contact band 34 which transfers power from the stator lead 52 to the phase lead 28 via the insert 40. The contact band 34 includes raised serrations 36, best shown in FIG. 5, that exert a radial force on the outer circumference of the connector 30 to securely engage the phase lead 28. One example commercially available style of contact band can be obtained from Multi-Contact of Germany.

Figure 7:
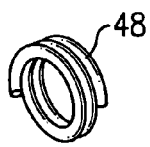
FIG. 7 is a perspective view of an example axial retainer.
Figure 6:
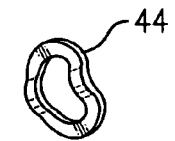
FIG. 6 is a perspective view of an example spring.

The connector 30 is retained axially within the insert 40 using an axial retainer, which is a spirolock 48 in the example shown. One example spirolock is a coiled wire, best shown in FIG. 7, which is rotationally inserted into the hole 38. In the example shown, the insert 40 includes a groove 46 for receiving the spirolock 48. The spirolock 48 abuts a shoulder 50 on the connector 30 to prevent its removal once the spirolock 48 is installed. A spring, such as a spring washer 44, (best shown in FIG. 6) can be installed in the base of the hole 38 to axially bias the connector 30 towards the spirolock 48.

Figure 5:
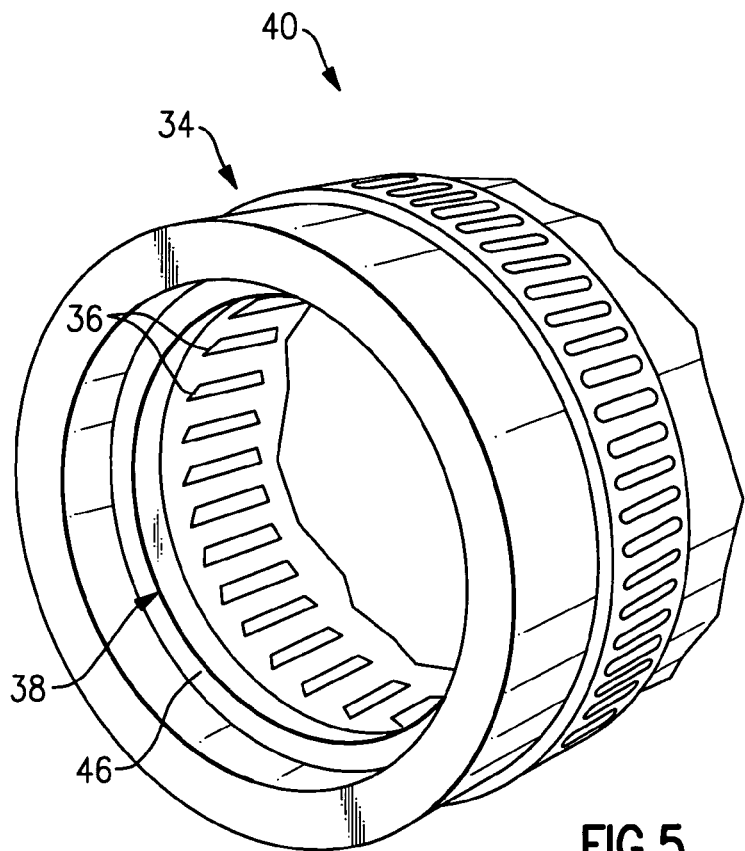
FIG. 5 is a perspective view of a portion of an insert depicting a contact band.

Only the front portion of the insert 40 is shown in FIG. 5. The insert 40 can also include structure providing another hole 54 for receiving a connector on stator leads 52 from the generator's stator. The insert 40 may include a contact band 56 providing the hole 54.

During assembly, once the stator leads 52 are inserted into the holes 54, the power interconnect block 22 can be secured to the generator housing 24 using fasteners 60 securing flanges 58 (one shown) of the power interconnect block 22. The connector 30 of each phase lead 28 is axially slid into a corresponding hole 38 of a receptacle 26. The contact band 34 of the insert 40 deflects and exerts a radial force on the circumference of the connector 30 to ensure there is sufficient engagement between the insert 40 and connector 30. The end of the connector 30 engages and deflects the spring washer 44. The spirolock 48 is installed into the groove 46 so that shoulder 50 is abutted and the connector 30 is retained by an axial force.

Although a preferred embodiment of this invention has been disclosed, a worker of ordinary skill in this art would recognize that certain modifications would come within the scope of this invention. For example, the power interconnect block can be used for electric motor or generators arranged in configurations other than shown. Also, different or fewer components may be used than shown. For that reason, the following claims should be studied to determine the true scope and content of this invention.

What is claimed is:

1. A power system for an aircraft comprising:
   a gear box;
   multiple generators driven by the gear box, the generators each having a power interconnect block providing a receptacle receiving an electrical lead, the receptacle provided by an insert having a hole that receives a connector arranged at an end of the electrical lead; and
   an axial retainer preventing removal of the connector from the power interconnect block in an axial direction.

2. The power system according to claim 1, comprising a pump, the generators arranged circumferentially around the pump.

3. The power system according to claim 1, wherein the generators each include a rotatable shaft having an axis, and the hole extends in a direction generally parallel with the axis.

4. The power system according to claim 1, wherein the power interconnect block includes a shell over-molded about the insert, the insert being metallic.

5. The power system according to claim 4, wherein the insert includes a contact band having raised serrations applying a radial force about a circumference of the connector.

6. The power system according to claim 1, wherein the axial retainer is arranged in the receptacle power interconnect block includes an axial retainer preventing removal of the connector from the power interconnect block in an axial direction.

7. The power system according to claim 6, wherein the axial retainer is a spirolock abutting a shoulder of the connector.

8. The power system according to claim 6, wherein a spring is arranged at a base of the hole, the spring biasing the connector toward the axial retainer to apply an axial force to the connector.

9. An electrical component for an aircraft comprising:
   a power interconnect block including a shell surrounding a metallic insert providing a hole;
   an electrical lead having an end with a connector, the connector received within the hole;
   an axial retainer secured between the connector and the power interconnect block axially locating the connector within the power interconnect block; and
   wherein a spring is arranged within the hole, the spring applying an axial force to the connector; and wherein the axial retainer is provided by a spirolock arranged within a groove in the insert.

10. The electrical component according to claim 9, wherein the insert includes a contact band having raised serrations applying a radial force to the connector.

11. The electrical component according to claim 9, wherein the connector includes a swage connection secured to a wire.

12. The electrical component according to claim 9 wherein the groove is arranged opposite the spring, the spirolock abutting a shoulder of the connector.

13. The electrical component according to claim 9, wherein the insert includes a second hole receiving a second electrical lead.

14. A method of connecting leads to an electrical component power interconnect block for an aircraft comprising the steps of:
   a) axially sliding an electrical connector into a hole provided by an insert;
   b) exerting a radial force about circumference of the electrical connector to provide engagement between the electrical connector and the insert for transferring power;
   c) installing an axial retainer in the power interconnect block to axially retain the electrical connector within the insert; and
   wherein step a) is performed by inserting the electrical connector into the insert in a direction generally parallel with a rotational axis of a shaft associated with the electrical component.

15. The method according to claim 14, comprising inserting a spring into the hole prior to performing step a), and exerting an axial force on the connector with the spring.

16. The method according to claim 14, wherein step c) is performed after step b).

17. A method of connecting leads to an electrical component power interconnect block for an aircraft comprising the steps of:
   a) axially sliding an electrical connector into a hole provided by an insert;
   b) exerting a radial force about circumference of the electrical connector to provide engagement between the electrical connector and the insert for transferring power; and
   c) installing an axial retainer in the power interconnect block to axially retain the electrical connector within the insert, wherein step c) is performed by rotating a spirolock into the hole.

* * * * *